Patented Nov. 18, 1941

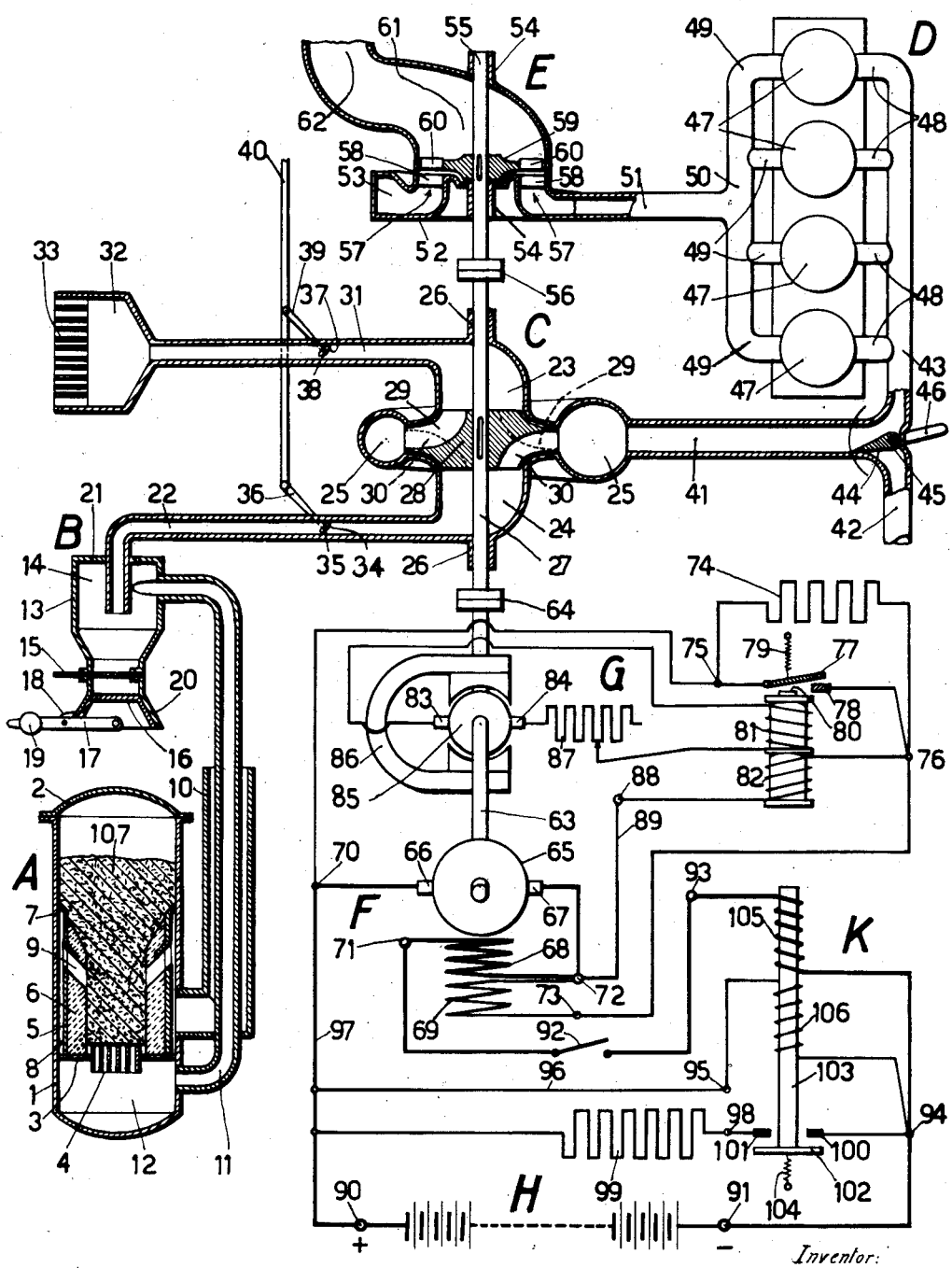

2,263,370

UNITED STATES PATENT OFFICE 2,263,370

INTERNAL COMBUSTION ENGINE INSTALLATION

Hesper von Tavel, Soleure, Soleure, Switzerland, assignor to Scintilla Ltd., Soleure, Switzerland, a corporation of Switzerland Application April 16, 1940, Serial No. 329,963
In Switzerland April 22, 1939

7 Claims. (Cl. 290—4)

This invention refers to an internal combustion engine installation comprising the engine itself, a blower for supplying thereto air and fuel from a convenient source, and a turbine operated by the exhaust gases of the internal combustion engine for driving the said blower. Preferably, the installation may be provided for operation on gaseous fuel.

One principal object of the invention is to provide means for enabling the blower to supply sufficient quantities of air and fuel to the internal combustion engine irrespectively of the momentary running conditions of the latter, and of the resulting output of the exhaust gas turbine, and in particular to supply air and fuel to the internal combustion engine preparatory to its starting.

I shall now proceed to the description of an embodiment of my invention and of the manner in which it is carried out, and it will be understood that while the description relates to what may be considered as a preferable embodiment of the invention, I do not limit myself to the precise conditions or proportions herein set forth, as they may be varied by those skilled in the art in accordance with the particular purposes for which they are intended, and the conditions under which they are to be utilized.

In the drawing, the reference letter A indicates generally a gas producer. It has a hollow cylindric body 1 which is closed at the bottom and a removable cover 2. Internally, it has a horizontal partition 3 with a central opening in which a grate 4 is arranged. The partition 3 carries an upwardly extending cylindrical wall 5 which has a fireproof lining 6 on its inner face. The upper end 7 of the wall 5 joins the body 1 so that an annular chamber 8 is formed on the outside of the wall 5. From the chamber 8, downwardly sloping slots 9 extend inwardly through the wall 5 and its lining.

A pipe 10 of large diameter connects the annular chamber 8 to the open air, and another pipe 11 of smaller diameter is arranged coaxially within a substantial portion of the length of the pipe 10. One end of the pipe 11 communicates with the chamber 12 below the partition 3 and the grate 4, within the body 1 of the gas producer.

The letter B indicates a purifying device for the gas which leaves the gas producer A through the pipe 11. Although purifiers of various kinds may be used for the same purpose, this purifying device has been exemplified by a so-called cyclone purifier. It comprises a hollow body 13 providing a chamber 14 of circular cross section which has a larger diameter in its upper part than in its lower part. The latter is traversed by a slidable plate 15 which normally forms the bottom closure of the chamber 14. Below the plate 15, a second closure for the said chamber is formed by a valve-like bottom 16 mounted on a lever 17 which is fulcrumed at 18 and has a counterweight 19 for pressing the bottom 16 against its conical seat provided by the bottom rim 20 of the body 13. The closed top 21 of the latter has a central opening into which an outlet pipe 22 fits; this pipe extends axially downward into the chamber 14. The aforementioned pipe 11 which comes from the gas producer A is connected to the body 13 so as to deliver the gas tangentially into the chamber 14, above the lower end of the outlet pipe 22.

The pipe 22 connects the purifier to the blower, which is generally indicated by the letter C. Its housing provides an air inlet chamber 23, a gas inlet chamber 24 communicating with the pipe 22, a spiral outlet chamber 25 and two bearings 26 for a shaft 27. To the latter, a runner 28 is keyed and separates the air inlet chamber 23 from the gas inlet chamber 24. This runner has vanes arranged in radial planes and leaving between them radially extending recesses or channels. Every alternate one of these channels is in open communication with the air inlet chamber 23 but is separated from the gas inlet chamber 24 by the solid material of the runner. The channels of this kind are indicated by the reference numeral 29. The other channels 30, which alternate with the channels 29, are in open communication with the gas inlet chamber 24 but separated from the air inlet chamber 23. Both the channels 29 and the channels 30 are open at the circumference of the runner towards the outlet chamber 25.

The air inlet chamber 23 communicates with the open air through a pipe 31 having an enlarged inlet portion 32 in which a grid 33 is provided for retaining impurities.

In the pipe 22 which connects the purifier to the gas inlet chamber 24 of the blower, a throttle valve 34 is provided for controlling the flow of gas. This valve is mounted on a shaft 35 which carries an adjusting lever 36 outside the pipe 22. A similar throttle valve 37 is provided in the air inlet pipe 31, on a shaft 38 which carries an adjusting lever 39. Both the adjusting levers 36 and 39 are linked to a common adjusting rod 40 which can be longitudinally shifted by the operator.

Communicating with the spiral outlet chamber 25 of the blower, is a pipe 41 which divides into two branch pipes 42 and 43. At the point of division, a flap 44 is provided on a shaft 45 extending to the outside. The arrangement of this flap with respect to the entrance of the two branch pipes is such that, according to the position of the flap 44, either the branch pipe 42 communicates with the pipe 41 while the entrance to the pipe 43 is closed, or the branch pipe 43 is in communication with the pipe 41, the entrance to the pipe 42 being obstructed. On the shaft 45, a lever 46 is mounted for manual operation of the flap 44.

The pipe 42 leads to the open air, while the pipe 43 forms the inlet trunk pipe of an internal combustion gas motor indicated by the general reference letter D. It may be of conventional design and in the present embodiment has four cylinders 47. Each cylinder has an inlet port 48 branched from the trunk pipe 43 and an exhaust port 49. These exhaust ports join the exhaust collecting pipe 50 which communicates with an exhaust gas turbine E through a further pipe 51.

This turbine E has a housing 52 which provides a spiral inlet chamber 53 in communication with the aforesaid pipe 51, and two bearings 54 for the shaft 55 of the turbine. This shaft is coupled at 56 to the shaft 27 of the blower C. At 57, the inlet chamber 53 has an annular opening across which radial guide blades 58 are fixed in the housing 52. To the turbine shaft 55, a runner wheel 59 is keyed; this wheel carries blades 60 which extend radially in front of the annular opening at 57. Seen in radial direction, the guide blades 58 and the runner blades 60 have inwardly curved streamlined profiles as usual in gas turbine construction, so that the pressure of the exhaust gases produces a turning moment on the runner wheel 59 when the said gases flow through the opening 57, between the blades. Beyond the said wheel, the gases are collected in a chamber 61 and carried away through a pipe 62.

The reference F indicates, in conventional diagrammatic representation, a dynamo electric machine, the rotor of which is carried by a shaft 63 coupled at 64 to the blower shaft 27. This machine has a wound rotor armature with collector of usual construction, conventionally indicated at 65, a pair of brushes 66 and 67 cooperating with the said collector, and exciter windings 68 and 69. The main current terminals of the machine are indicated at 70 and 71; the terminal 70 is directly connected to the brush 66, while the terminal 71 is connected to one end of the excitation winding 68; the opposite end terminal 72 of the latter is connected to the brush 67, so that the exciter winding 68 is in series with the winding on the armature 65.

The other exciter winding 69 has its one end connected to the end terminal 72 of the series exciter winding 68 and is thus also directly connected to the brush 67. The opposite end of the winding 69 is connected to a terminal 73. From the latter, a circuit goes through a regulating device G, which will be described in detail in the further course of this description, to the terminal 70; thus the exciter winding 69 is in parallel with the winding on the armature 65, and may be referred to as the shunt exciter winding.

Assuming that an electromotive force from an external source is applied between the terminals 70 and 71 for operating the dynamo electric machine F as a motor, current will flow from the terminal 70 through the brush 66, the winding of the armature 65, the brush 67, the terminal 72 and the series winding 68 to the terminal 71. Simultaneously, current will flow from the terminal 70 through the regulator G, the terminal 73, the shunt winding 69, the terminal 72 and the series winding 68, also to the terminal 71. The windings 68 and 69 are wound in such sense that under the said conditions the field produced by the series winding 68 reinforces the field produced by the shunt winding 69.

Assuming, however, that the dynamo machine works as a generator, the difference of potential between the brushes 66 and 67 will be greater than the difference of potential between the terminals 70 and 71. The current then flows, on one hand, from the brush 66 to the terminal 70 and back from the terminal 71 through the series winding 68 and the terminal 72 to the brush 67, and on the other hand, from the brush 66 and the terminal 70 through the regulating device G, the terminal 73, the shunt winding 69 and the terminal 72, to the brush 67. Thus, the field produced in the series winding 68 counteracts the field produced in the shunt winding.

The regulating device G comprises a resistance 74 the ends of which are connected to terminals 75 and 76, respectively. The terminal 75 is connected to the terminal 70 and the terminal 76 to the terminal 73 of the dynamo machine. The regulating device further comprises a movable armature 77 which is electrically connected to the terminal 75 and cooperates with a fixed contact 78 which is connected to the terminal 76. When in closed position, the armature 77 thus establishes a connection between the terminals 75 and 76 and shunts the resistance 74, but there is a spring 79 which tends to maintain the armature in an open position when this shunt connection is interrupted. In the closing direction the armature 77 is displaced by the electromagnetic attraction of an iron core 80 when the latter is energised.

This core carries two separate windings 81 and 82. The two ends of the winding 81 are connected, respectively, to the two brushes 83 and 84 of a tachometer dynamo 85 the rotor of which is carried by the shaft 63 of the dynamo electric machine F and the field of which is provided by a permanent magnet 86. Between the brush 84 and the corresponding end of the winding 81, an adjustable resistance 87 is provided in the circuit.

The winding 82 on the core 80 has its one end connected to the terminal 76, while its opposite end is connected to a separate terminal 88, from which a conductor 89 goes to the terminal 72 of the dynamo electric machine F. The winding 82 is wound on the core 80 in such a direction that current flowing therethrough from the terminal 76 to the terminal 72 tends to counteract the energisation of the core 80 produced by the current which the tachometer dynamo 85 sends through the winding 81. The self induction of the winding 82 is smaller than that of the shunt exciter winding 69 to which it is in parallel.

The terminal 70 of the dynamo electric machine F is connected to the positive terminal 90 of a storage battery H. Between the negative terminal 91 of the said battery and the terminal 71 of the dynamo electric machine F, there is a connection including a manually operable switch 92 and an automatic control device which will now be described.

The control device K has a terminal 93 connected, through the switch 92, to the terminal 71 of the dynamo electric machine, a terminal 94 connected to the negative terminal 91 of the battery, a terminal 95 directly connected, by a conductor 96, to the line 97 which goes from the dynamo terminal 70 to the positive battery terminal 90, and a terminal 98 which is connected through a resistance 99 to the same line 97. The terminals 94 and 98 are each connected to one of the two separate stationary contacts 100 and 101 of an electromagnetic switch. This latter has a contact bridge 102 carried by a longitudinally movable core 103. A spring 104 tends to keep the bridge 103 in the position in which the switch interrupts the connection between the terminals 94 and 98. For closing the switch, a stationary current winding 105 and a stationary voltage winding 106 are provided around the core 103. The current winding 105 is connected between the terminals 93 and 94, and the voltage winding 106 between the terminals 95 and 94. Proceeding towards the terminal 94, the turns of the winding 105 on the core 103 oppose those of the winding 106.

The described installation operates as follows:

To start the gas producer A, its space above the grate 4 is filled with wood or charcoal pieces 107, the cover 2 being temporarily removed for this purpose. Then a fire is lit in the chamber 12 below the grate 4, until the lower part of the wood or charcoal charge 107 is glowing until near the issue of the slots 9. Thereafter, the flap 44 is turned into the position for connecting the open air pipe 42 to the pipe 41 and the switch 92 is closed. The battery H being in charged condition, current then passes from the positive terminal 90 of the battery, over the line 97, the terminal 70 of the dynamo machine F, the brush 66, the windings of the armature 65, the brush 67, the terminal 72, the series exciter winding 68, the terminal 71, the closed switch 92, and the terminal 93, winding 105 and terminal 94 of the control device K to the negative terminal 91 of the battery H. A branch current flows from the terminal 70 of the dynamo electric machine F through the terminal 75, the resistance 74 and the terminal 76 of the regulating device G, the terminal 73 and the shunt exciter winding 69 of the dynamo electric machine F to the terminal 72 thereof, where it joins the main current. A further branch current flows from the terminal 76 of the regulating device G through the winding 82, the terminal 88, the conductor 89 and joins the first mentioned branch current at the terminal 72. Finally, a branch current also flows from the line 97 through the conductor 96, the terminal 95, the winding 106 to the terminal 94 of the control device K, where it joins the main current. The electromagnetic effects of the windings 105 and 106 then counteract each other, so that the contact bridge 102 is kept in open position by the spring 104, and the resistance 99 is out of circuit. Also the current passing through the winding 82 in the regulating device G cannot energise the said winding sufficiently to overcome the force of the spring 79 which maintains the armature 77 in open position.

The currents in the winding of the armature 65 and in the exciter windings 68 and 69 of the dynamo electric machine F cooperate to produce a turning moment on the said armature, so that the latter begins to rotate, and through the shafts 63, 27 and 55 also imparts rotation to the runners or wheels 28 of the blower C and 59 of the turbine E. The runner 28 then forces air from the air inlet chamber 23 through the channels 29 and from the gas inlet chamber 24 through the channels 30, both into the outlet spiral chamber 25. Thence the air is returned to the atmosphere through the pipes 41 and 42; in the inlet chambers 23 and 24, suction is thus produced. As a consequence further air is drawn from the atmosphere into the chamber 23, through the grid 33 and the pipe 31. For the chamber 24, the air is drawn through the gas producer A. It enters through the annular space between the pipes 10 and 11 and proceeds through the annular chamber 8, the slots 9, the glowing portion of the wood or charcoal charge 107 and the grate 4 to the chamber 12. Then it is drawn through the inside of the pipe 11 into the chamber 14 of the purifier B which it enters tangentially, and receives a whirling motion which maintains the air particles for some time in the said chamber. Only when these air particles have sufficiently slowed down to deposit on the plate 15 any dust which they carry with them, can they proceed through the pipe 22, and reach the inlet chamber 24 of the blower C.

The combustible charge 107 is then maintained glowing by the air draught from the slots 9 to the grate 4. In doing so, it develops combustible gas which by degrees replaces the air drawn from the bottom chamber 12 of the gas producer, through the pipe 11. This combustible gas leaves the said bottom chamber at high temperature but through the wall of the pipe 11 delivers its heat to the air which enters through the annular space between the pipes 10 and 11. The channels 30 in the runner then deliver mainly combustible gas to the spiral chamber 25, where this gas is very thoroughly mixed with the air which at the same time is delivered through the channels 29 of the runner 28. The mixture of air and combustible gas can be tested at the issue of the pipe 42, and when it has become rich enough to burn easily, the flap 44 can be turned over to deliver the mixture to the inlet trunk pipe 43 of the internal combustion engine D. With this mixture as motive means, the said engine can be started by cranking or otherwise.

While the internal combustion engine is running, it delivers hot exhaust gases under convenient pressure through the exhaust pipes 49, 50 and 51 into the spiral inlet chamber 53 of the turbine E. Thence, these gases proceed through the annular opening 57, where they are suitably guided by the blades 58, and through the intervals between the runner blades 60, so that they impart a turning moment to the wheel 59. Thereafter, they are carried off through the pipe 62.

The turning moment imparted to the wheel 59 is transmitted to the blower C by the shaft 55 and the coupling 56, and assists the dynamo electric machine F in driving the blower. The rotation of the shaft line 55, 27, 63 is thus accelerated. When these shafts have attained a definite speed, the current delivered by the tachometer dynamo 85 through the winding 81 of the regulating device G and the resistance 87 energises the said winding 81 to such an extent that the opposing effect of the winding 82 and of the spring 79 is overcome, and the armature 77 is attracted by the core 80. The armature 77 then touches the contact 78 and establishes a shunt connection between the terminals 75 and 76. As a consequence, the current for the shunt exciter winding 69 can by-pass the resistance 74 hence increases its intensity.

The increase of intensity, however, creates a compensating current, on account of the self induction in the shunt exciter winding 69. This compensating current flows through the winding 69 in opposite direction to the normal exciter current which has been reinforced, i. e. it opposes the increase of the said exciter current between the terminals 76 and 72, but it returns from the terminal 76 through the winding 82 and reinforces the branch current which flows through the latter towards the terminal 72. Owing to this reinforcement of current in the winding 82, the latter again overcomes the energising effect of the winding 81 on the core 80, so that the spring 79 draws the armature 77 back into its circuit opening position.

This results in a momentary diminution of the intensity of the current which runs through the exciter winding 69, but this diminution is opposed by the self induction effect in the winding 69, which produces a compensating current passing through the said winding 69 in the direction from the terminal 73 to the terminal 72, and thence back to the terminal 73 via the conductor 89, terminal 88, winding 82 and terminal 76. This time, the winding 82 is energised in such a way as to assist the winding 81. As a consequence, the armature 77 is again attracted by the core 80 and closes the shunt connection between the terminals 75 and 76. As this closing again produces an increase of the current through the exciter winding 69, the described cycle of operation recommences, so that the armature 77 effects vibrations between its opening and closing positions. The higher the speed of rotation of the shaft line 55, 27, 63 is, the greater is the intensity of the current through the winding 81, and the longer is each period during which the armature 77 is in closed position. On an average, the current through the shunt exciter winding, therefore, increases when the speed of the said shaft line increases.

This increase of exciter current tends to counteract the increase of speed, on account of the well-known characteristics of direct current machines. Thus, the effect of the regulating device is to maintain the speed of rotation of the shaft line, and more particularly of the blower, at a substantially constant value. This speed can be adjusted by modifying the resistance 87 which counteracts the flow of current in the winding 81.

When the internal combustion engine delivers increased power, the energy contained in its exhaust gases also has an increased value; the turning moment on the wheel 59 of the turbine may then exceed the turning moment required by the blower C for operating at the speed maintained by the regulator G. In this case, the increased excitation current in the periods in which the shunt connection between the terminals 75 and 76 is closed, no longer produces a diminution of the speed of rotation of the shaft line 55, 27, 63, but it causes the dynamo electric machine to operate as a generator while it is maintained at constant speed by the turbine E owing to the excess turning moment of the latter. Thus, the dynamo electric machine delivers current which flows from the brush 66 through the terminal 70 and the line 97 to the positive terminal 90 of the battery H, and from the negative terminal 91 of the battery through the terminal 94, the current winding 105, the terminal 93, the switch 92, the terminal 71, the series exciter winding 68, and the terminal 72 back to the brush 67. Thereby, the battery H is charged.

Although the current has reversed its direction of flow, the potential difference between the terminals 70 and 72 has not changed its sign, so that the shunt exciter current flows in the same direction as when the dynamo electric machine ran as a motor. It will be noted that now the series exciter winding 68 counteracts the shunt exciter winding 69. This counteraction is not very strong, because at the higher speed, the current which passes through the windings of the armature 65 is rather weak under these conditions. On the other hand, the speed has no decreasing effect on the current in the shunt exciter winding 69, except that produced by the regulating device G. Thus, the effect of the shunt winding 69 largely overcomes that of the series winding 68.

When the speed of rotation of the shaft line tends to increase, and the average exciter current through the winding 69 is also increased by the regulating device G, the current delivered by the dynamo electric machine increases too, while the turning moment required from the turbine E becomes greater. Therefore the latter cannot be accelerated further, and the speed for which the resistance 87 is adjusted, is maintained.

The current which passes through the current coil 105 of the control device K now is directed from the terminal 94 towards the terminal 93. As a consequence, the electromagnetic attraction of the current coil 105 on the core 103 assists that of the voltage coil 106. When the potential difference between the terminals 90 and 91 of the battery H approaches its highest admissible value, and a substantial charging current continues to pass through the current coil 105, then the combined attraction of the coils 105 and 106 overcomes the force of the spring 104, so that the core 103 is attracted and the bridge 102 connects the contacts 100 and 101 to each other. This now permits part of the charging current to be by-passed through the resistance 99, from the line 97 to the terminal 94 instead of passing through the battery H. Thereby, overcharging of the latter is automatically prevented.

It will be seen that with the installation described the runner 28 rotates at substantially constant speed. For a given setting of the adjusting rod 40, it also delivers a substantially constant quantity of combustible gas from the producer A, and a corresponding quantity of air. These quantities remain substantially unaffected by changes of the speed of the internal combustion engine D and can even be kept available when the latter is at a standstill. Of course under these conditions the flap 44 must be set to connect the pipe 41 to the outlet branch pipe 42, so that the mixture of combustible gas and air which is available for, but not taken in by the engine, may escape to the open air.

What is claimed is:

1. In combination an internal combustion engine; a turbine having its intake connected to the exhaust of said internal combustion engine; a blower for delivering air and fuel to said internal combustion engine; a dynamo electric machine suitable for working either as a generator or as a motor and having an armature conductor system and at least one exciter conductor system; driving connections between said turbine, blower and dynamo electric machine; a storage battery; a main circuit including the said battery and the armature conductor system of said dynamo machine; an exciter circuit including the said exciter conductor system of said dynamo machine; and a current regulator connected in said exciter circuit, and responsive to the speed of said blower for admitting current of increased average intensity through the said exciter circuit when the speed of the blower increases.

2. In combination an internal combustion engine; a turbine having its intake connected to the exhaust of said internal combustion engine; a blower for delivering air and fuel to said internal combustion engine; a dynamo electric machine suitable for working either as a current generator or as a motor and having an armature conductor system and at least one exciter conductor system; driving connections between said turbine, blower and dynamo electric machine; a storage battery; a main circuit including said battery and the armature conductor system of the dynamo electric machine; an exciter circuit branch connected to said main circuit in parallel with the armature conductor system and including the said exciter conductor system of the dynamo electric machine; a device responsive to the speed of the blower for modifying the average electric resistance of said exciter circuit branch.

3. In combination an internal combustion engine; a turbine having its intake connected to the exhaust of said internal combustion engine; a blower for delivering air and fuel to said internal combustion engine; a dynamo electric machine suitable for working either as a current generator or as a motor and having an armature conductor system and at least one exciter conductor system; driving connections between said turbine, blower and dynamo electric machine; a storage battery; a main circuit including said battery and the armature conductor system of the dynamo electric machine; an exciter circuit branch connected to said main circuit in parallel with the armature conductor system and including the said exciter conductor system of the dynamo electric machine; at least one resistance in said exciter circuit branch; a shunt connection between the ends of said resistance; a normally open switch in said shunt connection; actuating means responsive to the speed of said blower for at least intermittently closing said switch when the blower exceeds a predetermined speed.

4. In combination an internal combustion engine; a turbine having its intake connected to the exhaust of said internal combustion engine; a blower for delivering air and fuel to said internal combustion engine; a dynamo electric machine suitable for working either as a current generator or as a motor and having an armature conductor system and at least one exciter conductor system; a tachometer dynamo constructed to deliver an electric current the intensity of which varies in accordance with the speed at which the tachometer dynamo is driven; driving connections between said turbine, blower, dynamo electric machine and tachometer dynamo; a storage battery; a main circuit including the said battery and the armature conductor system of the dynamo electric machine; an exciter circuit including the said exciter conductor system of said dynamo machine; a regulator responsive to the current produced by the said tachometer dynamo, and connected to said exciter circuit for varying the average electric resistance thereof in opposite sense to the variation of the said current.

5. In combination an internal combustion engine; a turbine having its intake connected to the exhaust of said internal combustion engine; a blower for delivering air and fuel to said internal combustion engine; a dynamo electric machine suitable for working either as a current generator or as a motor and having an armature conductor system and at least an exciter conductor system; a tachometer dynamo constructed to deliver an electric current the intensity of which varies in accordance with the speed at which the tachometer dynamo is driven; driving connections between said turbine, blower, dynamo electric machine and tachometer dynamo; a storage battery; a main circuit including the said battery and the armature conductor system of the dynamo electric machine; an exciter circuit including the said exciter conductor system of the said dynamo electric machine; at least one resistance in the said exciter circuit; a shunt connection between the ends of said resistance; a normally open switch in said shunt connection; an electromagnet coil for closing the said switch; and a circuit comprising the said electromagnet coil and the said tachometer dynamo.

6. The combination claimed in claim 5 and comprising an auxiliary electromagnet coil connected to the said exciter circuit in parallel with the said exciter conductor system of the dynamo electric machine and effective on the said switch for modifying the effect of the first-said electromagnet coil in response to self-induction produced in the exciter circuit by the opening and closing of the switch.

7. In combination an internal combustion engine; a turbine having its intake connected to the exhaust of said iternal combustion engine; a blower for delivering air and fuel to said internal combustion engine; a dynamo electric machine suitable for operating either as a generator or as a motor and having an armature conductor system and at least one exciter conductor system; driving connections between said turbine, blower and dynamo electric machine; a storage battery; a main circuit including said battery and the armature conductor system of said dynamo electric machine; an exciter circuit including the said exciter conductor system of said dynamo electric machine; a current regulator connected in said exciter circuit and responsive to the speed of said blower for admitting current of increased average intensity through the said exciter circuit when the speed of the blower increases; a shunt connection between the terminals of the battery; a resistance in said shunt connection; a normally open switch in said shunt connection; and an electromagnet for actuating the said switch, said electromagnet comprising a voltage coil connected between the terminals of the said battery and a current coil connected between the dynamo electric machine and the battery, the said current coil being wound in such direction as to assist the voltage coil when traversed by current charging the battery.

HESPER VON TAVEL.